United States Patent
Sherwood et al.

(10) Patent No.: US 9,255,213 B2
(45) Date of Patent: Feb. 9, 2016

(54) SCRATCH AND ABRASION RESISTANT UV BLOCKING GLASS COATING

(71) Applicant: Tru Vue, Inc., Faribault, MN (US)

(72) Inventors: Philip William Sherwood, Milford, CT (US); Vinod Kanniah, Woodridge, IL (US); Jean Dee Breshears, Lockport, IL (US)

(73) Assignee: Tru Vue, Inc., Faribault, MN (US)

( * ) Notice: Subject to any disclaimer, the term of this patent is extended or adjusted under 35 U.S.C. 154(b) by 362 days.

(21) Appl. No.: 13/779,029

(22) Filed: Feb. 27, 2013

(65) Prior Publication Data

US 2014/0242272 A1 Aug. 28, 2014

(51) Int. Cl.
*C09D 183/00* (2006.01)
*C09D 183/06* (2006.01)
*C09D 183/02* (2006.01)
*C08L 83/02* (2006.01)

(52) U.S. Cl.
CPC ............... *C09D 183/06* (2013.01); *C08L 83/02* (2013.01); *C09D 183/02* (2013.01)

(58) Field of Classification Search
None
See application file for complete search history.

(56) References Cited

U.S. PATENT DOCUMENTS

| | | | |
|---|---|---|---|
| 4,122,233 A | 10/1978 | Proskow | |
| 4,495,360 A | 1/1985 | Anthony | |
| 5,371,138 A | 12/1994 | Schaefer | |
| 6,001,163 A | 12/1999 | Havey et al. | |
| 6,649,212 B2 | 11/2003 | Payne et al. | |
| 2003/0111159 A1* | 6/2003 | Hashimoto et al. | 156/99 |
| 2009/0004482 A1 | 1/2009 | Sharma | |
| 2009/0148711 A1* | 6/2009 | Le Blanc et al. | 428/447 |
| 2011/0020604 A1* | 1/2011 | Zheng | 428/148 |
| 2011/0034620 A1* | 2/2011 | Higuchi | 524/538 |

OTHER PUBLICATIONS

Nemeth et al., "Mechanical properties of hybrid sol-gel derived films as a function of composition and thermal treatment," 2009, Thin Solid Films, 517, pp. 4888-4891.*
S. Nemeth, Y.C. Liu, "Thin Solid Films", 517 (2009) 4888-4891.
L. Hu, X. Zhang, Y. Sun, R.J.J. Williams, "Journal of Sol-Gel Science and Technology", 34 (2005) 41-46.
L. Hu, X. Zhang, Y. Huang, "Plastics, Rubbers and Composites", 33 (2004) 457-461.
International PCT Search Report dated May 20, 2014 for International Application No. PCT/US2014/015743.

* cited by examiner

*Primary Examiner* — Robert Vetere
(74) *Attorney, Agent, or Firm* — Dorsey & Whitney LLP

(57) ABSTRACT

A resin for making abrasion and scratch resistant UV blocking glass coating. The resin can include an inorganic polysiloxane polymer matrix formed from water-based colloidal silica and tetraethylorthosilicate (TEOS). The resin also can include a bi-functional silanol coupling agent coupled to the inorganic polysiloxane polymer matrix. The resin further can include a UV absorber conjugated to the bi-functional silanol coupling agent. The resin also can include a solvent that is compatible with the colloidal silica, TEOS, bi-functional silanol agent, and UV absorber.

9 Claims, 2 Drawing Sheets

SCRATCH AND ABRASION RESISTANT UV BLOCKING GLASS COATING

TECHNICAL FIELD

The present invention relates to UV blocking coatings for glass that are scratch and abrasion resistant, and to methods of producing the same.

The glass coatings may be used for applications which benefit from both UV blocking and scratch resistance, such as art displays, glazing for picture frames and photographs, architectural and window glazing, opthalmic lenses, automotive glass and sunglasses.

BACKGROUND

Organic polymer coatings, such as acrylics and urethanes, can efficiently block ultraviolet ("UV") radiation. However, organic polymer coatings can be soft and scratch easily, when compared to an uncoated glass surface. On the other hand, inorganic materials, such as vacuum deposited ceramic oxide optical coatings, can be hard and scratch resistant. Inorganic materials, however, do not efficiently block UV radiation and can result in an undesirable yellow appearance in various applications, including when used to glaze artwork.

Various methods can be used for making coatings for glass that protect against UV light. See, for example, U.S. Pat. Nos. 4,495,360 and 4,122,233, which are incorporated by reference herein. The UV coatings can include a UV absorber that has compounds to absorb radiation of wavelengths starting in the near visible portion of the electromagnetic spectrum, which has a wavelength of around 400 nanometers, to the so-called vacuum ultraviolet portion of the spectrum, which can travel through a vacuum but is blocked by air and has a wavelength of around 200 nanometers in wavelength. These UV compounds can be used to protect items underlying transparent, semitransparent, and/or translucent substrates from the degradative effects of ultraviolet radiation absorption.

Various methods can be used for making abrasion-resistant coatings. See, for example, U.S. Pat. Nos. 6,649,212 and 6,001,163, which are incorporated by reference herein. Hybrid sol gel or Ormosil coatings have been developed to combine features of both the organic polymer coatings and the inorganic coatings. Such hybrid sol-gel coatings can have better scratch resistance than organic polymer coatings and more effectively block UV light when compared to inorganic coatings. U.S. Pat. No. 5,371,138 discloses a hybrid sol-gel UV blocking coating, and is incorporated by reference herein in its entirety. This patent also discloses the uses of methyltrimethoxysilane (MTMS) as an inorganic binder and glycols as a stabilizer in uncured resin. Applications for the hybrid sol-gel coatings include, but are not limited to, glass panes in paintings, art prints, and the like. Currently, for art display applications, hybrid sol-gel coatings based upon a formulation of MTMS binder using glycols are not sufficiently scratch resistant and require careful and experienced handling, especially when cutting the coating glass with a hand or wall cutter, and during assembly of an art picture frame. Therefore, further development is needed to improve the scratch and abrasion resistance for the UV blocking glass coatings so that custom picture framers and art glass fabricators can more easily handle the coated glass products.

SUMMARY

Embodiments described herein may provide scratch and abrasion resistant UV blocking glass coatings and methods for preparing the coatings.

In one embodiment, a method is provided for preparing the coatings. In one embodiment, the method includes some of the following steps: (a) preparing a first blend of aqueous colloidal silica and a solvent with a boiling point of about 230° C. or lower; (b) adding a bi-functional silanol coupling agent to the first blend to form a second blend; optionally (c) heating the second blend to a first elevated temperature such that the bi-functional silane coupling agent hydrolyzes to form a mixture of colloidal silica and a first silanol; (d) adding tetraethylorthosilicate (TEOS) to the mixture over a period of time to hydrolyze the TEOS to form a third blend of a second silanol, the first silanol, and the colloidal silica; (e) maintaining the third blend below a second elevated temperature, to avoid over-condensation of silanols; (f) adding a fourth blend to the third blend to form a fifth blend, the fourth blend including a UV absorber in the solvent; (g) casting the fifth blend onto a glass substrate; and (h) curing the fifth blend at a temperature below about 230° C. Depending upon the ratio of ingredients, step (c) may be omitted.

In some embodiments, the fourth blend can further include dyes and/or flow agents in the solvent. One suitable solvent, which has a boiling of 230° C. or lower, is 2-propoxyethanol (2-PE), also known as ethylene glycol monopropyl ether or ethylene glycol phenyl ether (EGPE). Other suitable solvents are volatile mono functional alcohols (like methanol, ethanol, propanol etc.,) and alpha-hydroxyl glycol ethers (like 2-propoxyl ethanol). Another suitable solvent is propylene glycol.

Any suitable bi-functional silanol coupling agent may be used. Suitable examples include glycidoxypropyltrimethoxysilane (GOPS, aka GPMS or GLYMO), or glycidoxypropyltriethoxysilane (GLEO), or isocyanatopropyltrimethoxysilane (Momentive A-1310). The UV absorber can be of the benzophenone, benzotriazole, or benzothiazole classes, such as Tinuvin 328, Tinuvin, 928, Tinuvin 1130, 2,2'-dihydroxybenzophone, and includes 2,2',4,4'-tetrahydroxybenzophenone (BP-2). The method also includes blending each of the first blend, second blend, third blend, fourth blend, and the fifth blend at temperatures between about 20° C. and about 50° C. The curing temperature is between about 150° C. and about 230° C., more preferably between about 175° C. and 200° C. The first elevated temperature is about 30° C., while the second elevated temperature is about 60° C., more preferably the first elevated temperature is about 40° C. and the second about 50° C. The period of time is about one hour.

In another embodiment, a resin is provided for making abrasion and scratch resistant UV blocking glass coating. The resin includes an inorganic polysiloxane polymer matrix formed from water-based colloidal silica ranging from about 0% to about 40% by weight, and tetraethylorthosilicate (TEOS) ranging from about 15% to about 40% by weight. The resin can also include a bi-functional silanol coupling agent coupled to the inorganic polysiloxane polymer matrix, the coupling agent ranging from about 5% to about 15% by weight. The resin can further include a UV absorber conjugated to the bi-functional silanol coupling agent, where the UV absorber ranges from about 3% to about 7% by weight. The resin also includes a solvent ranging from about 0% to about 35% by weight with a boiling point of about 230° C. or lower, where the solvent is compatible with the colloidal silica, TEOS, bi-functional silanol agent, and UV absorber.

In other embodiments, the solvent is selected from a group of high boiling point alchohols, such as glycols and glycol ethers. This includes propylene glycol, hexylene glycol, ethylene glycol, butyl cellosolve (aka ethylene glycol monobutyl ether), carbitol (aka diethylene glycol monoethyl ether), methyl carbitol (aka diethylene glycol monomethyl ether), and/or 2-propoxyethanol (2-PE, aka ethylene glycol monopropyl ether or EGPE). The UV absorber can include a benzophenone, such as 2,2',4,4'-tetrahydroxybenzophenone (BP-2). The bi-functional silane coupling agent can be glycidoxypropyltrimethoxysilane (COPS), glycodoxyipropyltriethoxysilane (GLYEO), and/or Momentive A-1130. The resin can include solvent-based colloidal silica ranging from about 0% to about 25% by weight, the solvent-based colloidal silica having about 20-40% SiO2 in the solvent. The resin can include solvent at about 0-30% by weight. The resin also can include water-based colloidal silica of about 0-40% by weight, the water-based colloidal silica being about 20-40% SiO2 in water. The resin further can includes TEOS of about 15-40% by weight, UV absorber of about 3-7% by weight, and the bi-functional silane coupling agent of about 5-20% by weight. The resin can also include a flowing agent of about 0-1% by weight, a red dye of about 0-0.05% by weight, and a blue dye of about 0-0.05% by weight. Those skilled in the art would appreciate that many other formulations also could be used.

Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification.

DETAILED DESCRIPTION

Figure 1:
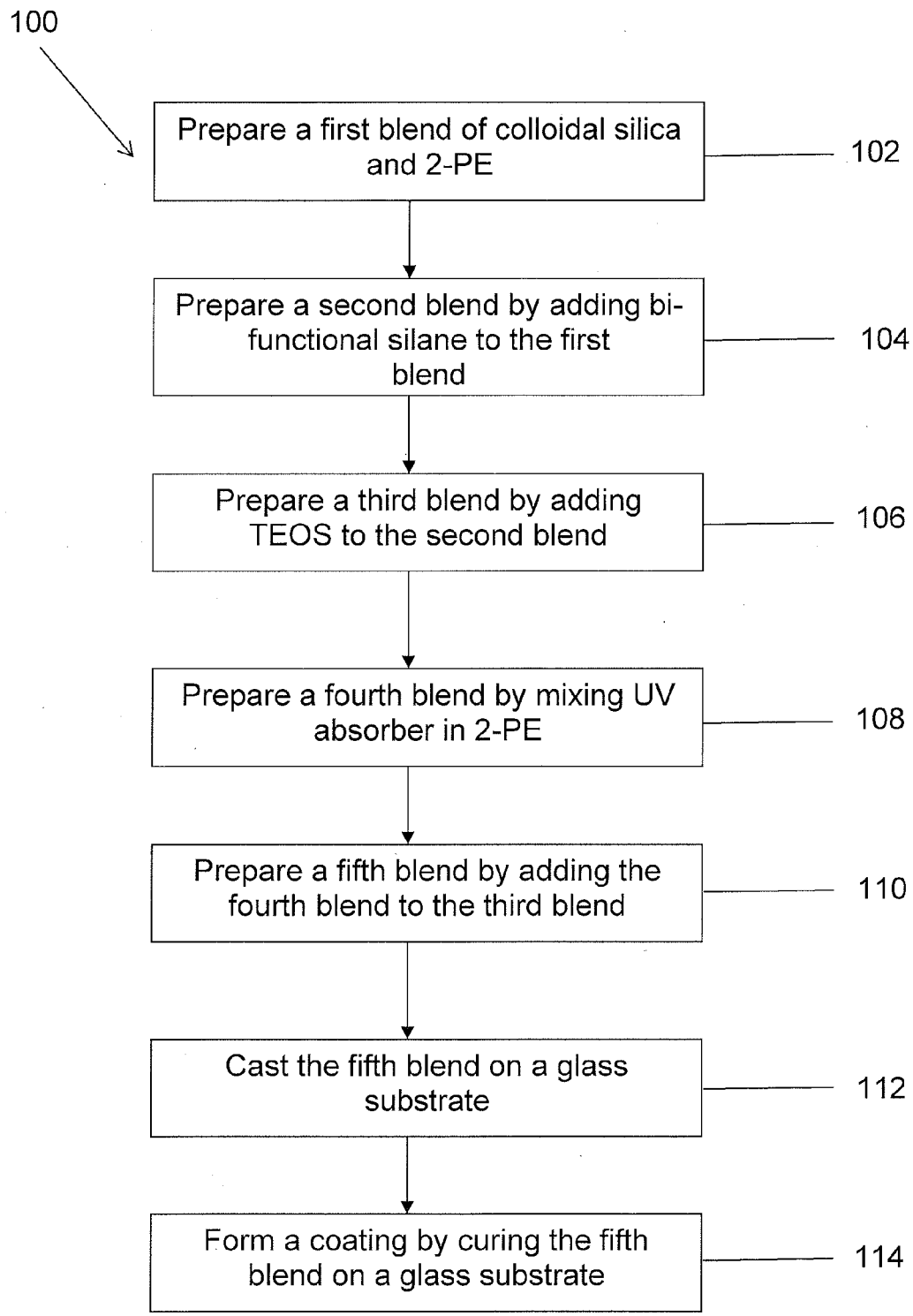
FIG. 1 is a flow chart illustrating steps for preparing resin in accordance with certain embodiments of the present disclosure.

The present disclosure may be understood by reference to the following detailed description. The present disclosure provides a hybrid inorganic-organic glass coating and method of preparing such a coating. The hybrid inorganic-organic glass coating is scratch resistant and also blocks UV radiation without adversely affecting the appearance of glazed artwork.

In one embodiment, the coating can include an inorganic polysiloxane polymer matrix made from colloidal silica and a tetraethylorthosilicate (TEOS) binder or primary monomer. The hard, inorganic TEOS matrix may be infused with a UV absorbing agent, such as a benzophenone which can conjugate to a bi-functional silanol coupling agent, for example, γ-glycidoxypropyltrimethoxysilane (or GOPS, aka GPMS, aka GLYMO). The resin formula using TEOS is compatible with other UV absorbers, and does not require bi-functional organic acids. The uncured resin can be diluted in a solvent, such as an alpha-hydroxy glycol or glycol ether, to stabilize the uncured resin. The cured coating, when cast on a glass and baked at a temperature below about 230° C., such as about 200° C., to a cured film of about 1-5 μm thick, can block at least about 97% of the UV, and more preferably at least 99% of the UV in the wavelength ranging from about 300 nm to about 380 nm. The cured coating is also resistant to scratching, for example, with a metal stylus such as a paper clip, and does not mar when rubbed with fine steel wool, for example, grade #0000. Such tests are described in ASTM C1624 (Standard Test Method for Adhesion Strength and Mechanical Failure Modes of Ceramic Coatings by Quantitative Single Point Scratch), ASTM D7027 (Standard Test Method for Evaluation of Scratch Resistance of Polymeric Coatings and Plastics Using an Instrumented Scratch Machine), ASTM D7187 (Standard Test Method for Measuring Mechanistic Aspects of Scratch/Mar Behavior of Paint Coatings by Nano-scratching), and ASTM E2546 (Standard Practice for Instrumented Indentation Testing).

Generally, the resin can include one or more of colloidal silica, TEOS, an ultraviolet-absorbing material, such as 2,2', 4,4' tetrahydroxybenzophenone, a bi-functional silanol coupling agent, and an alpha-hydroxy solvent with a boiling point equal to about 230° C. or lower, such as propylene glycol or 2-propoxyethanol (2-PE, aka ethylene glycol monopropyl ether, EGPE). The addition of colloidal silica to the resin or coating composition can enhance the abrasion resistance of the cured coating composition, and can also contribute to the overall stability of the coating composition. TEOS can increase the cross-linking density of the cured film. The bi-functional silanol coupling agent can couple the UV absorber to the inorganic polysiloxane polymer matrix or blend of the colloidal silica and TEOS. The resin may also include a red dye and a blue dye for correcting the color of a film formed from the resin composition. The resin may further include a flowing agent, which can decrease viscosity of the uncured resin before casting on a glass substrate. The resin may be cured at a temperature below about 230° C., or between about 175° C. and about 200° C. The coating then can be formed from the resin on the glass substrate.

The hybrid inorganic-organic coatings of the present disclosure combine the features of both organic polymer coatings and inorganic coatings. The hybrid inorganic-organic coating of the present disclosure both efficiently blocks UV radiation and is scratch resistant. The scratch and abrasion resistant coating of the present disclosure provides several benefits over the conventional coating, including that the coating is able to provide at least about 97% or higher protection from UV radiation without adversely impacting transmitted color, while still being hard and resistant to scratching. These coatings are useful for art display applications, because the art display needs to have very hard coatings so that the coatings do not scratch when placed into a metal wall cutter or assembled into a picture frame.

Process for Preparing Resin

FIG. 1 is a flow chart illustrating the steps of certain embodiments of the invention for preparing a UV blocking and scratch resistance coating. Process 100 starts with preparing a first blend of colloidal silica and 2-PE at operation 102, followed by preparing a second blend by adding bi-functional silane coupling agent to the first blend at operation 104. The method continues with preparing a third blend by adding TEOS to the second blend at operation 106, and preparing a fourth blend by adding UV absorber to 2-PE at operation 108, followed by preparing a fifth blend by mixing the third blend and the fourth blend at operation 110. Once the resin or the fifth blend is prepared, the fifth blend can be cast on a glass substrate at operation 112 and cured on the glass substrate at an elevated temperature to form the UV blocking and scratch resistance coating at operation 114. Optionally, each of dyes or flow agent may be added to form the fourth blend with 2-PE and then mixed with the third blend.

Figure 2:
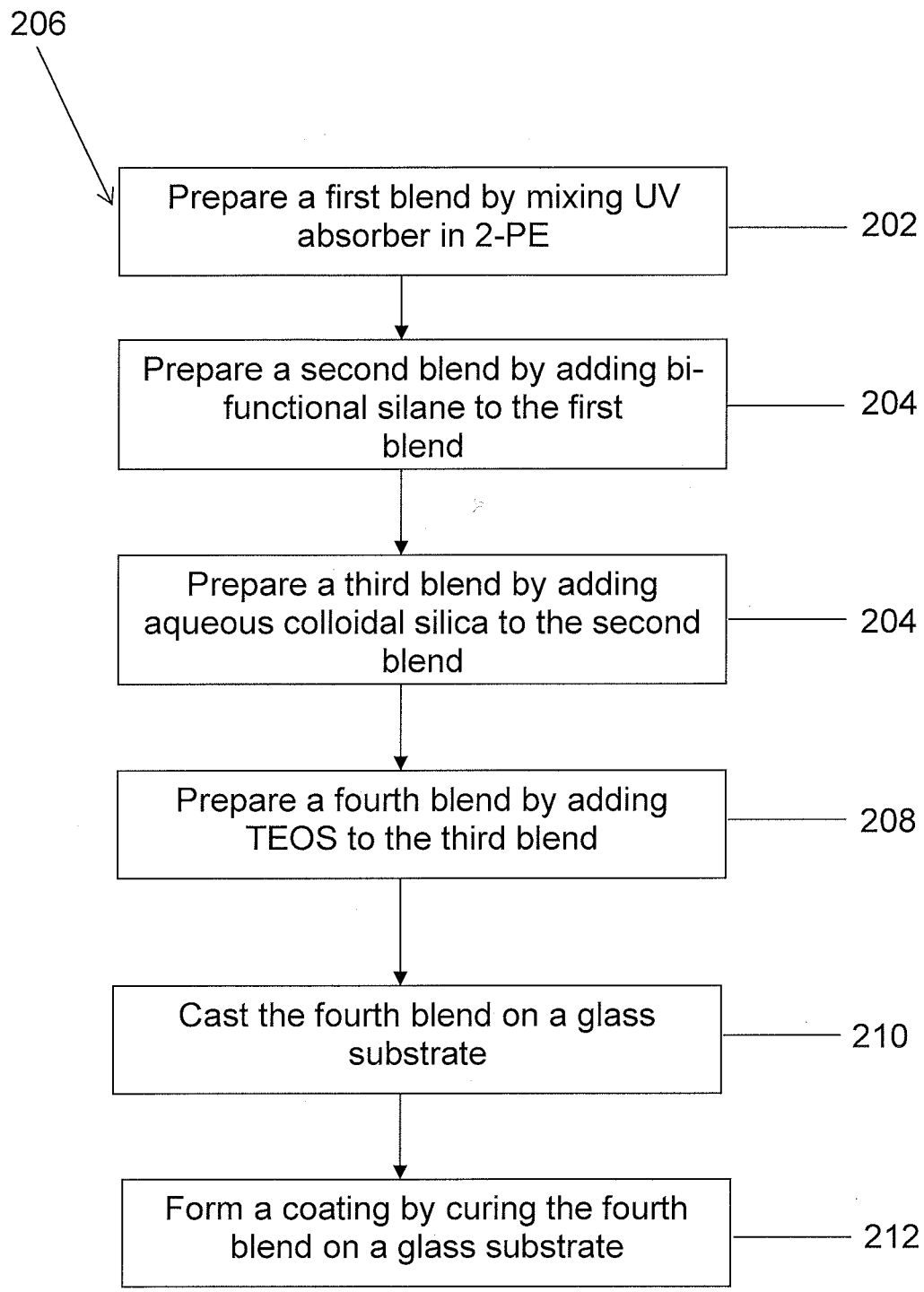
FIG. 2 is an alternative flow chart illustrating steps for preparing resin in accordance with certain embodiments of the present disclosure.

FIG. 2 is an alternative flow chart illustrating steps for preparing resin in accordance with certain embodiments of the present disclosure. Process 200 starts with preparing a first blend by mixing UV absorber in 2-PE at operation 202, followed by preparing a second blend by adding bi-functional silane coupling agent to the first blend at operation 204. The method continues with preparing a third blend by adding colloidal silica to the second blend at operation 206, and preparing a fourth blend by adding TEOS to the third blend at operation 208, followed by casting the fourth blend on a glass substrate at operation 210 and forming a coating by curing on the glass substrate at operation 212.

More specifically, the process for preparing the present resin includes the following steps: (a) Preparing a first blend aqueous colloidal silica (e.g. Nalco-1034A, available from Nalco Company of Naperville, Ill., or Nissan ST-O-40, available from Nissan Chemical America Corporation of Houston, Tex.) with 2-PE, (b) Adding to the first blend a bi-functional silane coupling agent, such as GOPS, in one aliquot to form a second blend, (c) Allowing the second blend to warm to about 40° C., while the bi-functional silanol coupling agent such as GOPS hydrolyzes to form a mixture of a colloidal silica and a first silanol, (d) Adding TEOS to the second blend slowly over a period of about 1 hour to hydrolyze the TEOS to form a mixture of the first silanol, a second silanol, and the colloidal silica, which is a third blend, (e) Keeping the third blend below about 50° C., to avoid over-condensation of silanols, (f) Separately, mixing each of the UV absorber, dyes, and flow agent with 2-PE to form a fourth blend, the fourth blend including UV absorber, optionally dyes, and flowing agent, (g) Adding the fourth blend to the third blend of silanols and colloidal silica to form a fifth blend, (h) Casting the fifth blend (uncured) onto a glass substrate to form glass coatings, and (i) Curing the fifth blend at a temperature below about 230° C. or between about 175° C. and about 200° C.

It is known in the art that TEOS is harder to process than MTMS. One challenge in the processing of TEOS is its solubility. Conventionally, the MTMS may be more attractive for use in the hybrid inorganic-organic coating due to its better solubility. Also, it is harder to chemically bond TEOS with UV absorber, such as BP-2. The present disclosure provides solutions to improve solubility of TEOS and the bonding with the UV absorber. The present process uses an alpha-hydroxy solvent such as 2-PE or propylene glycol to improve solubility of TEOS. This solvent is compatible with each of the components in the resin, including colloidal silica, bi-functional silanol coupling agent, UV absorber, dyes, and flowing agents. Also, a bi-functional silanol coupling agent can couple the UV absorber to the TEOS, and may help improve chemical bonding of TEOS to the UV absorber.

Furthermore, a blending process may be used to provide uniform blending. The blending process may be controlled within a certain temperature range. In a particular embodiment, the blending temperature may not be too low, as higher temperature helps with better blending. Blending temperature should not be so high as to cause polymerization, which can affect viscosity and can affect scratch resistance. Blending temperatures may be between about 30° C. and about 50° C. to provide uniform blending while avoiding polymerization. During blending, some methanol and ethanol may be created by the hydrolysis reaction of TEOS and the bi-functional silanol coupling agent with water from the water-based colloidal silica, and may be lost by evaporation. The resin may be cured at a higher temperature to increase scratch resistance. In the present disclosure, curing temperatures may be controlled at about –230° C. or below. Lower curing temperatures, below about 200° C., may help reduce the loss of UV absorber BP-2, because the BP-2 is unstable at elevated temperature, and may, for example, evaporate or decompose during curing at temperatures above about 230° C. In one embodiment, the curing temperature may be between about 175° C. and about 200° C.

Colloidal silica may be water-based, for example, Nissan ST-O-40 (available from Nissan Chemical America Corporation of Houston, Tex.) containing about 40% silicon oxide ($SiO_2$) in water ($H_2O$). The water-based colloidal silica may range from 0% to about 50% by weight, or about 39% by weight. Colloidal silica may be dispersed in an organic alpha-hydroxy solvent with relative lower boiling point, such as 2-propoxyethanol, for example, Nissan NPC-ST-30 (available from Nissan Chemical America Corporation of Houston, Tex.) containing about 30% $SiO_2$ in 2-propoxyethanol may be used. The solvent based colloidal silica may range from about 0% to about –30% by weight. In one embodiment, there is little to no $SiO_2$ in 2-propoxyethanol.

For preparing the resin composition, the primary solvent may be 2-propoxyethanol (aka ethylene glycol monopropyl ether) or propylene glycol, which ranges from about 0% to about –35% by weight. In one embodiment, the primary solvent is about 17.0% by weight. A secondary solvent may be used for help with the stability of the uncured resin. The secondary solvent may be propylene glycol at or less than about 20% by weight. In one embodiment, the secondary solvent is about 0% by weight, or is absent.

The primary silanol monomer is TEOS ranging from about 10% to about 40% by weight. The TEOS may be about 25% by weight to provide proper cross-linking density for desired abrasion resistance.

The bi-functional silanol coupling agent may be used for coupling the UV absorber to the inorganic polysiloxane polymer matrix or blend of the colloidal silica and TEOS. The bi-functional silanol coupling agent may be gamma-glycidoxypropyltrimethoxysilane (GOPS, also called GLYMO), which ranges from about 5% to about 15% by weight. In a particular embodiment, the bi-functional silanol coupling agent is about 11.5% by weight.

The ultraviolet (UV) absorber may be 2,2',4,4'-tetrahydroxybenzophenone (BP-2, also called Uvinul D-50), which ranges from about 3% to about 7% by weight. In a specific embodiment, the UV absorber is about 6.1% by weight. UV absorbers can exhibit a yellow hue or color when they are not fully dispersed. In the present disclosure, the UV absorber can conjugate to the bi-functional silanol coupling agent, such as GOPS/GLYMO. As a result, the present resin can eliminate the use of a bi-functional organic acid, such as a succinic acid or an itaconic acid, which could be used to conjugate to the bi-functional silanol coupling agent (GOPS/GLYMO).

The color effect of UV absorber may require correction by adding traces of dyes or tinting agents to correct the color. A first tinting agent may be added to the present resin to help correct for glass hue. The first tinting agent may include red dye. A second tinting agent may also be added to help correct for UV absorber hue. The second tinting agent may include blue dye. The effective amount of the first tinting agent may be controlled, for example, to around 0.024%, depending upon desired hue correction. The effective amount of the second tinting agent may be controlled, for example, to around 0.0063%, also depending upon desired hue correction.

The present resin may also include flow agent for viscosity control during the monomer reaction and curing stages of film preparation. Flow control or leveling agents can be higher molecular weight oligomers. Flow and leveling agent may use Dow Corning 190 fluid (also known as Xiameter 190). The flow control agents may impact the physical properties of the cured films, such as causing reduction in hardness or scratch and abrasion resistance. Therefore, the flow agent may be controlled to be at an effective amount, for example, about 0.10% by weight, which may vary with the application method.

Coating on Glass Substrate

The resin may be cast on a glass substrate to form a coating on the glass substrate, such as by roll coating. The coating process, such as roll coating, may affect the quality of the film, including scratch and abrasion resistance, UV blocking, optical clarity, etc.

EXAMPLES

The following examples are presented as illustrations of forming coatings on a glass substrate by using the methods disclosed above. As can been seen from the following examples, the coatings described herein provide better mechanical properties, such as hardness, modulus, and scratch resistance, and still substantially maintain the UV resistance as conventional coatings.

The coatings were tested according to ASTM standard tests as mentioned earlier or other standard methods for hardness, modulus, scratch resistance, and UV resistance.

The coating of the present disclosure has improved bulk film properties compared to the conventional coatings. The bulk film properties of the present coating include a Young's Modulus ($E_r$) of around 20 GPa and an indentation hardness (H) of about 1.5 GPa when indented at less than 15% of the coating thickness. The indentation hardness may be measured with a 10 μm diameter diamond berkovich indenter tip. The bulk film properties also include a brittle index of about 0.07 for the present coating (brittle index is defined as a ratio of Hardness to Modulus). The mechanical properties further include critical loads to adhesion failure at an interface of a film to a substrate. The critical loads may be determined with a 10 μm radius cono-spherical diamond tip, and were found to be over about 100 mN. The critical loads correspond to the scratch/abrasion resistance of coated films along with the other bulk film properties The mechanical properties, such as hardness, of the present invention, given their sol-gel type nature and optical functionality (UV blocking), are superior to those of cured films made from conventional alkoxy silane based precursors reported by [1] S. Nemeth, Y. C. Liu, Thin Solid Films, 517 (2009) 4888-4891; [2] L. Hu, X. Zhang, Y. Sun, R. J. J. Williams, Journal of Sol-Gel Science and Technology, 34 (2005) 41-46; and [3] L. Hu, X. Zhang, Y. Huang, Plastics, Rubbers and Composites, 33 (2004) 457-461], such as MTMS. Generally, the soda lime glass used as substrate for the coated articles reportedly has a hardness of 5.5 GPa, Young's modulus of 74 GPa, and a brittle index of around 0.075. As shown, coatings of the new invention can have a brittle index of about 0.07, a hardness of 1.5 GPa, and a Modulus of about 20 GPa. In addition, the "critical load of adhesion" is measured using a nano-scratch tester. The present coatings have critical loads ranging from 40 mN to 160 mN, normally greater than 100 mN. In contrast, the critical loads of the coatings of U.S. Pat. No. 5,371,138 have critical loads around 40 mN, much lower than the critical loads of 100 mN to 160 mN While not intending to be bound by theory, it is believed that the inductive activation of the alcohol by the propoxy functionality in 2-PE may enhance the leaving group during the condensation process of polymerizing silanols and silyl alcohol ethers present in the uncured resin, so that cross-linking density may be increased, thus improving scratch and abrasion resistance.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for preparing a resin composition, the method comprising:
    preparing a first blend of aqueous colloidal silica and a solvent, the solvent comprising 2-propoxyethanol;
    adding a bi-functional silane coupling agent to the first blend to form a second blend;
    adding tetraethylorthosilicate (TEOS) to the second blend over a period of time of about one hour to hydrolyze the TEOS to form a third blend of a second silanol, the first silanol, and the colloidal silica; and
    adding a fourth blend to the third blend to form a fifth blend, the fourth blend comprising 2,2'-dihydroxybenzophone or 2,2',4,4'-tetrahydroxybenzophenone in the solvent;
    casting the fifth blend onto a glass substrate, and
    curing the fifth blend.

2. The method of claim 1, further comprising heating the second blend to a first elevated temperature such that the bi-functional silane coupling agent hydrolyzes to form a mixture of colloidal silica and a first silanol.

3. The method of claim 2, wherein the first elevated temperature is about 40° C.

4. The method of claim 1, further comprising maintaining the third blend below a second elevated temperature wherein the second elevated temperature is about 50° C.

5. The method of claim 1, wherein the fourth blend includes at least one dye and a flow agent.

6. The method of claim 1, wherein the bi-functional silane coupling agent is selected from a group consisting of glycidoxypropyltriethoxysilane, 3-glycidoxypropyltrimethoxysilane, and isocyanatopropyltrimethoxysilane.

7. The method of claim 1, further comprising blending each of the first blend, second blend, third blend, fourth blend, and fifth blend at a temperature between about 30° C. and about 50° C.

8. The method of claim 1, wherein the curing is carried out at a temperature of between about 150° C. and about 230° C.

9. A method for preparing a resin composition, the method comprising:
    preparing a first blend by mixing 2,2'-dihydroxybenzophone or 2,2',4,4'-tetrahydroxybenzophenone in a solvent, the solvent having a boiling point of about 230° C. or lower and comprising 2-propoxyethanol;
    adding a bi-functional silane selected from glycidoxypropyltrimethoxysilane, glycidoxypropyltriethoxysilane, or isocyanatopropyltrimethoxysilane to the first blend to form a second blend;
    adding aqueous colloidal silica to the second blend to form a third blend;

adding tetraethylorthosilicate to the third blend to form a fourth blend;
casting the fourth blend onto a glass substrate; and
curing the fourth blend.

* * * * *